(12) United States Patent
Cooper et al.

(10) Patent No.: US 8,931,043 B2
(45) Date of Patent: Jan. 6, 2015

(54) SYSTEM AND METHOD FOR DETERMINING AND USING LOCAL REPUTATIONS OF USERS AND HOSTS TO PROTECT INFORMATION IN A NETWORK ENVIRONMENT

(75) Inventors: Geoffrey Howard Cooper, Palo Alto, CA (US); David Frederick Diehl, Minneapolis, MN (US); Michael W. Green, Shoreview, MN (US); Robert Ma, Sunnyvale, CA (US)

(73) Assignee: McAfee Inc., Santa Clara, CA (US)

( * ) Notice: Subject to any disclaimer, the term of this patent is extended or adjusted under 35 U.S.C. 154(b) by 0 days.

(21) Appl. No.: 13/443,865

(22) Filed: Apr. 10, 2012

(65) Prior Publication Data
US 2013/0268994 A1   Oct. 10, 2013

(51) Int. Cl.
*G06F 21/00* (2013.01)
*G06F 15/16* (2006.01)

(52) U.S. Cl.
USPC ............... 726/1; 726/23; 726/25; 709/224; 709/225

(58) Field of Classification Search
USPC ............... 726/22–25, 1–2, 28, 29; 709/238, 709/224–226, 229
See application file for complete search history.

(56) References Cited

U.S. PATENT DOCUMENTS

| | | |
|---|---|---|
| 4,289,930 A | 9/1981 | Connolly et al. |
| 4,384,325 A | 5/1983 | Slechta et al. |
| 4,386,416 A | 5/1983 | Giltner et al. |
| 4,532,588 A | 7/1985 | Foster |
| 4,713,780 A | 12/1987 | Schultz et al. |
| 4,754,428 A | 6/1988 | Schultz et al. |
| 4,837,798 A | 6/1989 | Cohen et al. |
| 4,853,961 A | 8/1989 | Pastor |
| 4,864,573 A | 9/1989 | Horsten |
| 4,951,196 A | 8/1990 | Jackson |
| 4,975,950 A | 12/1990 | Lentz |
| 4,979,210 A | 12/1990 | Nagata et al. |

(Continued)

FOREIGN PATENT DOCUMENTS

| | | |
|---|---|---|
| WO | WO 2013/003493 | 1/2013 |
| WO | WO 2013/155239 A1 | 10/2013 |

OTHER PUBLICATIONS

TrustedSource: The Next Generation Reputation System for Enterprise Gateway Security, White Paper, McAfee, 2009.*

(Continued)

*Primary Examiner* — David Garcia Cervetti
*Assistant Examiner* — Shanto M Abedin
(74) *Attorney, Agent, or Firm* — Patent Capital Group (57) ABSTRACT

A method in an example embodiment includes correlating a first set of event data from a private network and determining a local reputation score of a host in the private network based on correlating the first set of event data. The method further includes providing the local reputation score of the host to a security node, which applies a policy, based on the local reputation score of the host, to a network communication associated with the host. In specific embodiments, the local reputation score of the host is mapped to a network address of the host. In further embodiments, the first set of event data includes one or more event indicators representing one or more events, respectively, in the private network. In more specific embodiments, the method includes determining a local reputation score of a user and providing the local reputation score of the user to the security node.

18 Claims, 5 Drawing Sheets

(56) References Cited

U.S. PATENT DOCUMENTS

| | | |
|---|---|---|
| 5,008,814 A | 4/1991 | Mathur |
| 5,020,059 A | 5/1991 | Gorin et al. |
| 5,051,886 A | 9/1991 | Kawaguchi et al. |
| 5,054,096 A | 10/1991 | Beizer |
| 5,105,184 A | 4/1992 | Pirani et al. |
| 5,119,465 A | 6/1992 | Jack et al. |
| 5,136,690 A | 8/1992 | Becker et al. |
| 5,144,557 A | 9/1992 | Wang |
| 5,144,659 A | 9/1992 | Jones |
| 5,144,660 A | 9/1992 | Rose |
| 5,167,011 A | 11/1992 | Priest |
| 5,210,824 A | 5/1993 | Putz et al. |
| 5,210,825 A | 5/1993 | Kavaler |
| 5,235,642 A | 8/1993 | Wobber et al. |
| 5,239,466 A | 8/1993 | Morgan et al. |
| 5,247,661 A | 9/1993 | Hager et al. |
| 5,276,869 A | 1/1994 | Forrest et al. |
| 5,278,901 A | 1/1994 | Shieh et al. |
| 5,283,887 A | 2/1994 | Zachery |
| 5,293,250 A | 3/1994 | Okumura et al. |
| 5,313,521 A | 5/1994 | Torii et al. |
| 5,319,776 A | 6/1994 | Hile et al. |
| 5,355,472 A | 10/1994 | Lewis |
| 5,367,621 A | 11/1994 | Cohen et al. |
| 5,377,354 A | 12/1994 | Scannell et al. |
| 5,379,340 A | 1/1995 | Overend et al. |
| 5,379,374 A | 1/1995 | Ishizaki et al. |
| 5,384,848 A | 1/1995 | Kikuchi |
| 5,404,231 A | 4/1995 | Bloomfield |
| 5,406,557 A | 4/1995 | Baudoin |
| 5,414,833 A | 5/1995 | Hershey et al. |
| 5,416,842 A | 5/1995 | Aziz |
| 5,418,908 A | 5/1995 | Keller et al. |
| 5,424,724 A | 6/1995 | Williams et al. |
| 5,479,411 A | 12/1995 | Klein |
| 5,481,312 A | 1/1996 | Cash et al. |
| 5,483,466 A | 1/1996 | Kawahara et al. |
| 5,485,409 A | 1/1996 | Gupta et al. |
| 5,495,610 A | 2/1996 | Shing et al. |
| 5,509,074 A | 4/1996 | Choudhury et al. |
| 5,970,066 A | 10/1999 | Lowry et al. |
| 5,987,610 A | 11/1999 | Franczek et al. |
| 6,073,142 A | 6/2000 | Geiger et al. |
| 6,460,050 B1 | 10/2002 | Pace et al. |
| 7,305,709 B1 | 12/2007 | Lymer et al. |
| 7,415,727 B1 | 8/2008 | Lowe et al. |
| 7,506,155 B1 | 3/2009 | Stewart et al. |
| 7,555,776 B1 | 6/2009 | Lymer et al. |
| 7,680,890 B1 | 3/2010 | Lin |
| 7,870,203 B2 * | 1/2011 | Judge et al. ................. 709/206 |
| 7,937,480 B2 | 5/2011 | Alperovitch et al. |
| 7,953,814 B1 | 5/2011 | Chasin et al. |
| 8,042,181 B2 | 10/2011 | Judge |
| 8,045,458 B2 | 10/2011 | Alperovitch et al. |
| 8,051,134 B1 | 11/2011 | Begeja et al. |
| 8,069,481 B2 | 11/2011 | Judge |
| 8,079,087 B1 | 12/2011 | Spies et al. |
| 8,095,876 B1 | 1/2012 | Verstak et al. |
| 8,132,250 B2 | 3/2012 | Judge et al. |
| 8,160,975 B2 | 4/2012 | Tang et al. |
| 8,179,798 B2 | 5/2012 | Alperovitch et al. |
| 8,185,930 B2 | 5/2012 | Alperovitch et al. |
| 8,201,257 B1 * | 6/2012 | Andres et al. ................. 726/25 |
| 8,214,497 B2 | 7/2012 | Alperovitch et al. |
| 8,239,915 B1 | 8/2012 | Satish et al. |
| 8,381,289 B1 * | 2/2013 | Pereira et al. ................. 726/22 |
| 8,396,211 B2 | 3/2013 | Brown et al. |
| 8,549,611 B2 | 10/2013 | Judge et al. |
| 8,561,167 B2 | 10/2013 | Alperovitch et al. |
| 8,578,051 B2 | 11/2013 | Alperovitch et al. |
| 8,578,480 B2 | 11/2013 | Judge et al. |
| 8,589,503 B2 | 11/2013 | Alperovitch et al. |
| 8,606,910 B2 | 12/2013 | Alperovitch et al. |
| 8,621,559 B2 | 12/2013 | Alperovitch et al. |
| 8,621,618 B1 * | 12/2013 | Ramsey et al. ................. 726/22 |
| 8,621,638 B2 | 12/2013 | Judge et al. |
| 8,631,495 B2 | 1/2014 | Judge et al. |
| 8,635,690 B2 | 1/2014 | Alperovitch et al. |
| 2001/0037311 A1 | 11/2001 | McCoy et al. |
| 2001/0049793 A1 | 12/2001 | Sugimoto |
| 2002/0004902 A1 | 1/2002 | Toh et al. |
| 2002/0009079 A1 | 1/2002 | Jungck et al. |
| 2002/0013692 A1 | 1/2002 | Chandhok et al. |
| 2002/0016910 A1 | 2/2002 | Wright et al. |
| 2002/0023089 A1 | 2/2002 | Woo |
| 2002/0023140 A1 | 2/2002 | Hile et al. |
| 2002/0026591 A1 | 2/2002 | Hartley et al. |
| 2002/0032871 A1 | 3/2002 | Malan et al. |
| 2002/0035683 A1 | 3/2002 | Kaashoek et al. |
| 2002/0042876 A1 | 4/2002 | Smith |
| 2002/0046041 A1 | 4/2002 | Lang |
| 2002/0049853 A1 | 4/2002 | Chu et al. |
| 2002/0051575 A1 | 5/2002 | Myers et al. |
| 2002/0059454 A1 | 5/2002 | Barrett et al. |
| 2002/0062368 A1 | 5/2002 | Holtzman et al. |
| 2002/0078382 A1 | 6/2002 | Sheikh et al. |
| 2002/0087882 A1 | 7/2002 | Schneier et al. |
| 2002/0095492 A1 | 7/2002 | Kaashoek et al. |
| 2002/0112013 A1 | 8/2002 | Walsh |
| 2002/0112185 A1 | 8/2002 | Hodges |
| 2002/0116627 A1 | 8/2002 | Tarbotton et al. |
| 2002/0120853 A1 | 8/2002 | Tyree |
| 2002/0133365 A1 | 9/2002 | Grey et al. |
| 2002/0138416 A1 | 9/2002 | Lovejoy et al. |
| 2002/0138755 A1 | 9/2002 | Ko |
| 2002/0138759 A1 | 9/2002 | Dutta |
| 2002/0138762 A1 | 9/2002 | Horne |
| 2002/0143963 A1 | 10/2002 | Converse et al. |
| 2002/0147734 A1 | 10/2002 | Shoup et al. |
| 2002/0147923 A1 | 10/2002 | Dotan |
| 2006/0015561 A1 | 1/2006 | Murphy et al. |
| 2006/0015563 A1 | 1/2006 | Judge et al. |
| 2006/0031314 A1 | 2/2006 | Brahms et al. |
| 2006/0253447 A1 | 11/2006 | Judge |
| 2006/0253458 A1 | 11/2006 | Dixon et al. |
| 2006/0253579 A1 | 11/2006 | Dixon et al. |
| 2006/0253581 A1 | 11/2006 | Dixon et al. |
| 2006/0265747 A1 | 11/2006 | Judge |
| 2006/0267802 A1 | 11/2006 | Judge et al. |
| 2007/0002769 A1 | 1/2007 | Matityahu et al. |
| 2007/0078675 A1 | 4/2007 | Kaplan |
| 2007/0079379 A1 | 4/2007 | Sprosts et al. |
| 2007/0083929 A1 | 4/2007 | Sprosts et al. |
| 2007/0107059 A1 | 5/2007 | Chasin et al. |
| 2007/0130350 A1 * | 6/2007 | Alperovitch et al. ......... 709/229 |
| 2007/0130351 A1 | 6/2007 | Alperovitch et al. |
| 2007/0162587 A1 | 7/2007 | Lund et al. |
| 2007/0220607 A1 | 9/2007 | Sprosts et al. |
| 2007/0244974 A1 | 10/2007 | Chasin |
| 2008/0022384 A1 | 1/2008 | Yee et al. |
| 2008/0133540 A1 | 6/2008 | Hubbard et al. |
| 2008/0162265 A1 | 7/2008 | Sundaresan et al. |
| 2008/0175226 A1 | 7/2008 | Alperovitch et al. |
| 2008/0175266 A1 | 7/2008 | Alperovitch et al. |
| 2008/0178259 A1 * | 7/2008 | Alperovitch et al. ............. 726/2 |
| 2008/0229422 A1 * | 9/2008 | Hudis et al. ..................... 726/25 |
| 2008/0244744 A1 * | 10/2008 | Thomas et al. ................. 726/23 |
| 2008/0282338 A1 | 11/2008 | Beer |
| 2009/0007102 A1 * | 1/2009 | Dadhia et al. ..................... 718/1 |
| 2009/0150236 A1 * | 6/2009 | Price .............................. 705/14 |
| 2009/0172818 A1 | 7/2009 | Sutherland et al. ............ 726/25 |
| 2009/0178142 A1 * | 7/2009 | Lieblich et al. ................. 726/25 |
| 2009/0222877 A1 | 9/2009 | Diehl et al. |
| 2009/0232300 A1 * | 9/2009 | Zucker et al. .................... 380/2 |
| 2009/0328209 A1 | 12/2009 | Nachenberg |
| 2010/0223349 A1 * | 9/2010 | Thorson ............................ 726/1 |
| 2010/0242082 A1 | 9/2010 | Keene et al. ..................... 726/1 |
| 2010/0306846 A1 * | 12/2010 | Alperovitch et al. .......... 726/23 |
| 2011/0040825 A1 | 2/2011 | Ramzan et al. |
| 2011/0067086 A1 | 3/2011 | Nachenberg et al. |
| 2011/0197275 A1 | 8/2011 | Chasin et al. |
| 2012/0096516 A1 | 4/2012 | Sobel et al. |
| 2012/0174219 A1 * | 7/2012 | Hernandez et al. ............ 726/22 |
| 2012/0291087 A1 * | 11/2012 | Agrawal ............................ 726/1 |

(56) References Cited

U.S. PATENT DOCUMENTS

| | | |
|---|---|---|
| 2012/0331556 A1 | 12/2012 | Alperovitch et al. |
| 2013/0246925 A1 | 9/2013 | Ahuja et al. |
| 2013/0247201 A1 | 9/2013 | Alperovitch et al. |

OTHER PUBLICATIONS

A Survey of Trust and Reputation Systems for Online Service Provision, Audun Josang et al, Decision Support Systems, 43(2), pp. 618-644, 2007.*

USPTO Dec. 13, 2012 Nonfinal Office Action from U.S. Appl. No. 13/052,739.

Ford, R.; Allen, W.H., "Malware Shall Greatly Increase . . . ," Security & Privacy, IEEE, vol. 7, No. 6, pp. 69-71, Nov.-Dec. 2009.

Bonatti, Piero, et al., "An integration of reputation-based and policy-based trust management," networks 2.14 (2007): 10.

Kai Hwang; Kulkareni, S.; Yue Hu, "Cloud Security with Virtualized Defense and Reputation-Based Trust Management," Dependable, Autonomic and Secure Computing, 2009. DASC '09. Eighth IEEE International Conference on, vol., No., pp. 717-722, Dec. 12-14, 2009.

International Search Report and Written Opinion for International Application No. PCT/US2012/044453 mailed Jan. 14, 2013.

Jamie Barnett, Reputation: The Foundation of Effective Threat Protection, McAfee, White Paper, 11 pages, copyright 2010, retrieved Apr. 16, 2012 from http://www.mcafee.com/us/resources/white-papers/wp-rep-effective-threat-protection.pdf.

McAfee GTI Reputation & Categorization Services, copyright 2003-2012, retrieved Apr. 16, 2012 from http://www.mcafee.com/us/mcafee-labs/technology/gti-reputation-technologies.aspx.

TrustedSource: The Next Generation Reputation System for Enterprise Gateway Security, McAfee, White Paper, copyright 2009 McAfee, Inc., 20 pages, retrieved Apr. 16, 2012 from http://www.mcafee.com/us/resources/white-papers/wp-trusted-source-next-gen-rep-sys.pdf.

U.S. Appl. No. 13/052,739, filed Mar. 21, 2011, entitled "System and Method for Malware and Network Reputation Correlation," Inventor(s) Dmitri Alperovitch.

U.S. Appl. No. 13/170,163, filed Jun. 27, 2011, entitled "System and Method for Protocol Fingerprinting and Reputation Correlation," Inventor(s) Dmitri Alperovitch, et al.

International Search Report and Written Opinion for International Application No. PCT/US2013/036053, mailed Sep. 23, 2013, 14 pages.

USPTO Mar. 13, 2013 Response to Dec. 13, 2012 Nonfinal Office Action from U.S. Appl. No. 13/052,739.

USPTO Mar. 25, 2013 Final Office Action from U.S. Appl. No. 13/052,739.

USPTO Jul. 25, 2013 AFCP Response to Mar. 25, 2013 Final Office Action from U.S. Appl. No. 13/052,739.

USPTO Aug. 12, 2013 Advisory Action from U.S. Appl. No. 13/052,739.

USPTO Aug. 26, 2013 Request for Continued Examination and Response to Final Office Action mailed Mar. 25, 2013 from U.S. Appl. No. 13/052,739.

International Preliminary Report on Patentability for International Application No. PCT/US2013/044453, mailed Jan. 16, 2014, 10 pages.

Non-Final Office Action in U.S. Appl. No. 13/170,163 mailed on Jun. 6, 2014, (15 pages).

Non-Final Office Action in U.S. Appl. No. 13/052,739 mailed on Sep. 2, 2014 (26 pages).

International Preliminary Report on Patentability for International Application Serial No. PCT/US2013/036053 mailed on Oct. 14, 2014 (10 pages).

* cited by examiner

SYSTEM AND METHOD FOR DETERMINING AND USING LOCAL REPUTATIONS OF USERS AND HOSTS TO PROTECT INFORMATION IN A NETWORK ENVIRONMENT

TECHNICAL FIELD

This disclosure relates in general to the field of network security and, more particularly, to a system and method for determining and using local reputations of users and hosts to protect information in a network environment.

BACKGROUND

The field of network security has become increasingly important and complex in today's society. Businesses and other organizations often store confidential or sensitive information in their private computer networks, which are typically protected by various security mechanisms such as firewalls. The need to protect confidential and sensitive information in a private network is complicated by the Internet and by users within the networks. The Internet has enabled interconnection of different computer networks all over the world, and has also presented many opportunities for malicious operators to breach security mechanisms such as firewalls in order to exploit these networks. For some types of malicious software, once it has infected a host computer, a malicious operator may issue commands from a remote computer to control the malicious software. The software can be instructed to perform any number of malicious actions, such as sending out spam or malicious emails from the host computer, stealing sensitive information from a business or individual associated with the host computer, and propagating to other host computers.

Authorized users within a private network can also jeopardize the security of confidential and sensitive information in a network. Unwitting users can compromise a private network by engaging in risky behaviors with sensitive information associated with the network. Often, risky behaviors are not detected until network security has been breached. Other authorized users may have more sinister motives and could use their authorized access to pilfer confidential or sensitive information unnoticed from hosts or other assets in the network. Thus, the ability to effectively protect and maintain stable computers and systems continues to present significant challenges for component manufacturers, system designers, and network operators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method in an example embodiment includes correlating a first set of event data from a private network and determining a local reputation score of a host in the private network based on the correlating the first set of event data. The method further includes providing the local reputation score of the host to a security node, where the security node applies a policy, based on the local reputation score of the host, to a network communication associated with the host. In specific embodiments, the local reputation score of the host is mapped to a network address of the host. In further embodiments, the first set of event data includes one or more event indicators representing one or more events, respectively, in the private network, and each of the one or more events is associated with the network address of the host. In more specific embodiments, the method includes determining a local reputation score of a user based on correlating a second set of event data and providing the local reputation score of the user to the security node if the network communication is associated with the user.

A method in another example embodiment includes correlating a first set of event data from a private network and determining a local reputation score of a host in the private network based on the correlating the first set of event data. The method further includes providing the local reputation score of the host to the host, where a policy is selected based on the local reputation score of the host, and the policy is applied to a process detected by the host. In specific embodiments, the process includes copying files to an off-line media connected to the host. In more specific embodiments, the method includes determining a local reputation score of a user of the private network based on correlating a second set of event data and providing the local reputation score of the user to the host if the user is the process owner of the process.

Example Embodiments

Figure 1:
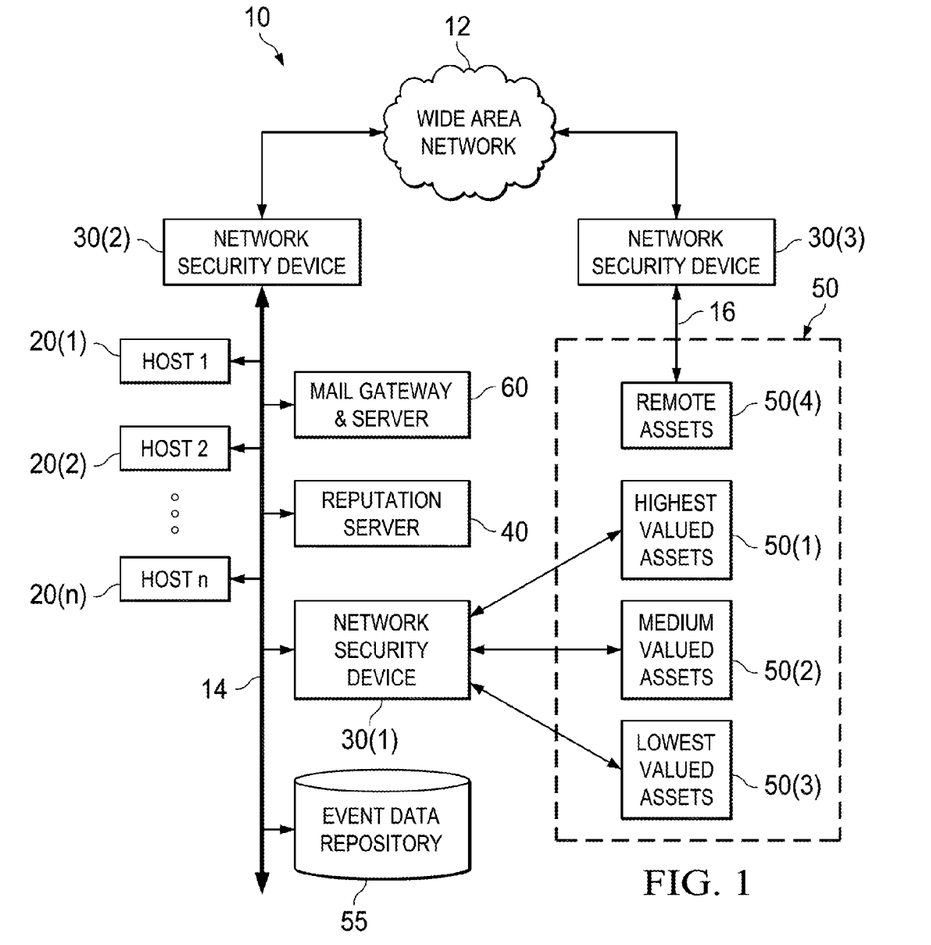
FIG. 1 is a simplified block diagram of an example embodiment of a network environment in which a system can be implemented for determining and using local reputations of users and hosts to protect network information in accordance with this specification.

FIG. 1 is a simplified block diagram of an example network environment 10 in which a system for determining and using local reputations of users and hosts to protect information can be implemented. In the example embodiment illustrated in FIG. 1, network environment 10 can include a private network 14, a remote network 16, and a wide area network 12 (e.g., the Internet), which provides a communication pathway between private and remote networks 14 and 16, respectively. Private network 14 can include hosts 20(1) through 20(n), a reputation server 40, an internal network security device 30(1), an external facing network security device 30(2), and assets 50(1)-50(3). In addition, private network 14 may also include a mail gateway & server 60 and an event data repository 55. Remote network 16 can include an external facing network security device 30(3) and remote assets 50(4).

Network environment 10, in FIG. 1, represents a series of points or nodes of interconnected communication paths for receiving and transmitting packets of information that propagate through network environment 10. The term 'network node' or 'node' as used herein, is intended to include an active electronic device that is attached to a network. Generally, nodes are capable of sending, receiving, or forwarding information over a communications channel. Some nodes, however, can be passive (e.g., Intrusion Prevention System (IPS)) and may not be capable of sending packets. Additionally, a transparent mode IPS or firewall may not have an Internet Protocol (IP) address. Finally, network environment 10 offers communicative interfaces between the nodes, including both transparent and passive modes.

Private network 14 can be configured in any suitable form (e.g., an Intranet or Extranet, a local area network (LAN), wide area network (WAN), wireless local area network (WLAN), virtual local area network (VLAN), etc.) using private address space. Private and remote networks 14 and 16 can belong to the same entity (e.g., an enterprise, an education organization, a government organization, a non-profit organization, etc.) and can be configured to communicate via network traffic traversing wide area network 12 between the local and remote networks. Remote network 16 can also be configured in any suitable form and could be part of an intranet or extranet of private network 14. In other embodiments, remote network 16 could be configured as another private network that communicates with private network 14 via the Internet using, for example a virtual private network (VPN) configuration.

Assets 50(1)-50(4) are collectively referenced herein as 'network assets 50' and can include network elements such as servers that contain content, resources, and services valued by the entity in varying degrees (e.g., highest valued assets 50(1), medium valued assets 50(2), and lowest valued assets 50(3)). In the example shown in FIG. 1, assets 50(1)-50(3) in private network 14 are protected by network security device 30(1), which can include network elements such as a gateway, a firewall, an intrusion prevention system (IPS), or other appropriate security node to block unauthorized internal communications (e.g., from hosts 20) to assets 50, and to permit authorized internal communications. External facing network security devices 30(2) and 30(3) can also include network elements such as a gateway, a firewall, or an IPS to control communications between nodes in respective networks 14 and 16, and other network nodes that may be accessible through wide area network 12.

Hosts 20(1)-20(n) are collectively referenced herein as 'hosts 20' and can generally be configured as a type of network node including, but not limited to, any type of termination point in a network such as a desktop computer, a server, a laptop, a mobile telephone, a tablet, or any other suitable device, component, element, or object that is operable to exchange information in a network environment, that can receive or establish a connection with another node, and that has a network address (e.g., an Internet Protocol (IP) address, a Media Access Control (MAC) address).

In one example implementation, network security devices 30, reputation server 40, assets 50, and mail gateway & server 60 are network elements, which are a type of network node, and are meant to encompass network appliances, servers, routers, switches, gateways, bridges, loadbalancers, firewalls, intrusion prevention systems (IPS), processors, modules, or any other suitable device, component, element, or object operable to exchange information in a network environment. Network elements and hosts may include any suitable hardware, software, components, modules, interfaces, or objects that facilitate the operations thereof. This may be inclusive of appropriate algorithms and communication protocols that allow for the effective exchange of data or information.

Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Network environment 10 may include a configuration capable of transmission control protocol/Internet protocol (TCP/IP) communications for the electronic transmission or reception of packets in a network. Network environment 10 may also operate in conjunction with a user datagram protocol/IP (UDP/IP) or any other suitable protocol, where appropriate and based on particular needs.

Certain terminologies are used herein with regard to the various embodiments of the present disclosure. The term 'data' as used herein, refers to any type of numeric, voice, video, or script data, or any type of source or object code, or any other information in any appropriate form that may be communicated from one point to another in network nodes and/or networks. Also, note that in this Specification, references to various features (e.g., elements, structures, modules, components, steps, operations, characteristics, etc.) included in 'one embodiment', 'example embodiment', 'an embodiment', 'another embodiment', 'some embodiments', 'various embodiments', 'other embodiments', 'alternative embodiment', etc. are intended to mean that any such features are included in one or more embodiments of the present disclosure.

For purposes of illustrating the operational aspects of a system for determining and using local reputations of users and hosts to protect network assets, it is important to understand the activities occurring within a given network. The following foundational information may be viewed as a basis from which the present disclosure may be properly explained. Such information is offered for purposes of explanation only and, accordingly, should not be construed in any way to limit the broad scope of the present disclosure and its potential applications.

Typical network environments used by enterprises or other entities include the ability to communicate electronically with other networks using, for example, the Internet to access web pages hosted on servers connected to the Internet, to send or receive electronic mail (i.e., email) messages, to exchange files with end users or servers connected to the Internet, or to provide or access services hosted on servers connected to the Internet. Malicious users are continuously developing new tactics that use the Internet to spread malware and to gain access to private networks and confidential information. Malware is often crafted to subvert a host within a network and use it for malicious activities such as information theft. Of course, malware is not the only risk to information stored in networks. Some individuals who have legitimate access to a private network may be compromised and intentionally transmit (or attempt to transmit) information in violation of applicable laws and/or policies. Other individuals may not have malicious goals, but may nevertheless inadvertently or unknowingly transmit information in violation of such laws and policies.

Potential threats to an entity's private network can exist both internally (e.g., within an intranet) and externally (e.g., from the Internet). Externally, the Internet can include untrusted and potentially malicious users in addition to untrusted and potentially malicious websites. Internally, a private network of an entity may be accessed by outsiders with legitimate, but possibly limited access to the intranet, such as visitors and contractors of the entity. Additionally, a private network is typically configured to allow its own users to have varying degrees of access to its assets. At least some trusted users generally have access to the highest valued assets within the network. Thus, if a trusted user has malicious motives, such a person could potentially cause significant network security breaches by simply accessing and disclosing critical or sensitive information that the trusted, malicious user was authorized to access. Even trusted users with no malicious intent, however, can cause security breaches. Such users could have a compromised host and/or could make mistakes using the available technology, possibly facilitating inadvertent disclosure of confidential or sensitive information.

Managing risk in private networks can be a time-consuming process of identifying and assessing risks to the network, and of balancing the risk with the needs of users to continue accessing the network resources for legitimate activities. In order to properly manage risk in a private network, policies applied to the network should be based on a function of the value of an asset and the level of risk of an operation on that asset. Moreover, policies have to be balanced with the need of authorized users to access the network and conduct legitimate activities in the network. Accordingly, some network security implementations may not be configured to trigger policy violations for activities that could be considered risky (e.g., accessing highest valued assets during off-hours, emailing confidential information to others within the network), but are not conclusively malicious or illegal. In other network security implementations in which these types of risky activities do trigger policy violations, a detected policy violation may simply result in generating an alert, while allowing the risky activity to continue. The alert may be logged or sent to an administrator to evaluate and take appropriate action if warranted. Therefore, in these situations, risky activities may continue until an administrator recognizes a problem (e.g., repeated policy violations, different types of policy violations involving the same source, etc.) and takes appropriate action.

Monitoring alerts and correlating the information can be burdensome, particularly in larger networks. Consequently, a potential problem may not even be identified until network security has been breached (e.g., confidential information has been disclosed). For example, one email between collaborating employees within a private network that contains confidential information may be considered a low risk activity, because the activity itself does not disclose confidential information outside of the entity. Thus, such an activity may simply trigger an alert to be sent to an administrator. However, a series of emails containing confidential information could put the entity at greater risk, but the policy triggering the alert would generally be applied statically and independently to each email instance. Thus, until the discrete alerts are noticed and acted upon by an administrator, emailing confidential information within the private network could continue, allowing the employees to accumulate and disseminate more and more confidential information, thereby increasing the risk to the network.

Figure 2:
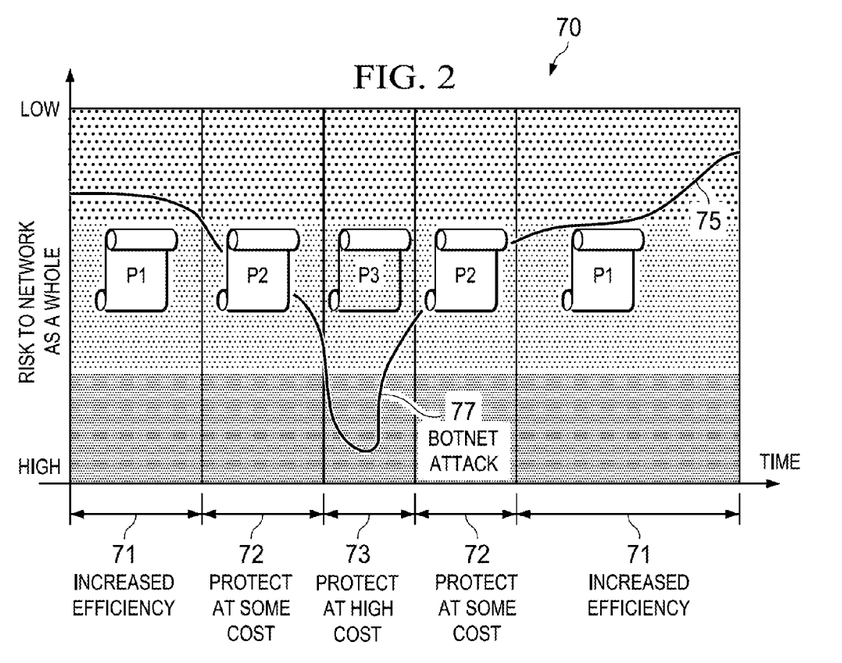
FIG. 2 is a graph of risk to a private network as a function of time and how policies can be applied in the network using known network security techniques in an example scenario.

In some network environments, managing risk in a private network is accomplished by designating different policies to be applied to network elements for different time periods characterized by a threshold level of risk. FIG. 2 illustrates this approach with a graph 70 illustrating network risk as a function of time and how different policies are applied during different time periods, which are characterized by different levels of risk, in an example network. In FIG. 2, time periods delineated along the x-axis are characterized as increased efficiency 71 (low risk), protect at some cost 72 (medium risk), and protect at high cost 73 (high risk). The network risk is indicated along the y-axis from high risk to low risk. A graph line 75 represents the determined risk to the network as a whole during the various time periods. Accordingly, a less restrictive policy (P1) may be applied to the network when risk to the network is low and, therefore, the time period is characterized by a desire for increased efficiency 71 as the users and hosts in the network are allowed to operate with the least restrictions. When network risk increases, a medium restrictive policy (P2) may be applied to the network when the risk to the network is medium and therefore, the time period is characterized by a desire to protect at some cost 72. Thus, policy (P2) may include some policies that prevent users and hosts from performing certain functions within the network. Finally, the most restrictive policy (P3) may be applied to the network when the risk to the network is high, during the time period characterized by a desire to protect at high cost 73. Accordingly, during this time period, policies may significantly limit the network functions available to users and hosts in the network.

One problem with the approach illustrated in FIG. 2, however, is the application of a highly restrictive policy (P3) during times of high risk, because the highly restrictive policy (P3) may affect all hosts and users of the network to which it is applied, rather than just the particular hosts and/or users who are creating the risk. For example, if the risk to the network is determined to be high because suspicious activities are indicative of a botnet attack 77 (e.g., numerous connection attempts in the night from one host in the network), the most restrictive policy (P3) is applied to all hosts and their users rather than the particular hosts and/or users from which the suspicious activities were detected.

A system for determining and using local reputations of users and hosts to protect information in a network environment (as shown in FIG. 1) can resolve many of these issues. FIG. 1 illustrates one embodiment in which a local reputation score can be computed per each host and/or each user of an entity's network, and can be used to dynamically select and apply policies to network communications, processes, or both, associated with hosts and/or users. Multiple network nodes, including dedicated network security devices and hosts having a policy-driven security application incorporated therein, can each generate event notifications containing event data that identifies a host and a user associated with security events in which a network policy was violated or informational events of certain acceptable behaviors. Event data could also include other information such as an event indicator that identifies the event that triggered the policy violation (e.g., the action taken, information affected by the action, etc.). Additionally or alternatively, event data repositories can be scanned, data mined, or crawled selectively or regularly for logged event data (i.e., data that is logged or otherwise stored and that is related to security or informational events of a private network). Furthermore, event data repositories may also be searched for specific event data. Event data that is found during scanning, data mining, crawling, or searching can be fetched by reputation server 40. The event notifications, the logged event data, or any suitable combination thereof can be aggregated and correlated by reputation server 40, which can then determine local reputation scores for each host and each user associated with the events represented by the event notifications and logged event data. Reputation server 40 can communicate the local reputation scores of hosts and users to a network security device, which may be configured to protect network assets 50, or to a host configured to protect itself. The network security device can evaluate the local reputation score of a host and/or a user associated with a network communication it has received, and dynamically choose a policy to apply to the network communication based on the local reputation scores. Similarly, the host can evaluate the local reputation of itself (or a second host attempting to access the first host) and a user associated with a process on the host, and dynamically choose a policy to apply to the process based on the local reputation scores.

Figure 3:
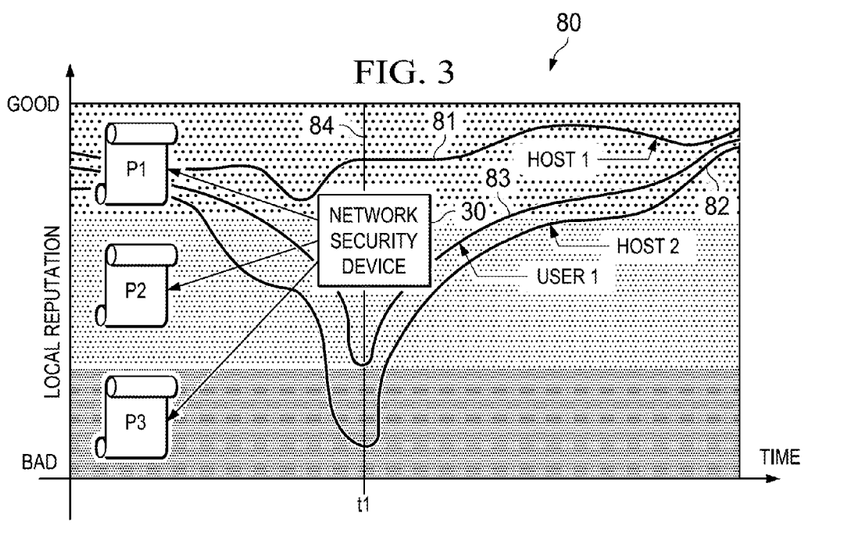
FIG. 3 is a graph of a local reputation score of a host or user in a private network as a function of time and how policies can be applied in an example scenario in accordance with embodiments of this specification.

FIG. 3 illustrates this approach with a graph 80 depicting local reputation score as a function of time and showing how policies can be dynamically applied to specific hosts and/or users over time, based on their local reputation scores. Local reputation scores can provide a historical and/or behavioral risk score for each host and/or user associated with a network communication or host process in a private network. Examples of risky behaviors and histories that could be represented by a local reputation score include a user who was involved in risky operations in the network, a user that does not follow corporate policies, a host that was recently infected with malware, etc.

In FIG. 3, time is represented along the x-axis and local reputation scores are represented along the y-axis and range from bad (a low score) to good (a high score). A first graph line 81 represents a local reputation score of host 1 over a period of time, a second graph line 82 represents a local reputation score of host 2 over the same period of time, and a third graph line 83 represents a local reputation score of user 1 over the same period of time. During the period of time represented in graph 80, host 1 is covered by a first policy (P1), host 2 is covered by all available policies (P1, P2, and P3), and user 1 is covered by first and second policies (P1 and P2). As the local reputation scores of the user and hosts move down or up, the policies applied to them are changed. The first policy (P1) can be a less restrictive policy that is applied to the user and hosts when their local reputation scores are good. The second policy (P2) can be somewhat more restrictive than the first policy (P1) and is applied to user 1 and host 2 when their local reputation scores move down and are between a good score and a bad score. The third policy (P3) can be the most restrictive policy and is applied to host 2 when its local reputation score moves down to a bad reputation score threshold. Network security device 30 can dynamically choose and apply policies based on local reputation scores. To illustrate this, at time t1, represented by vertical line 84 in the example graph 80, P1 is applied to host 1, P2 is applied to user 1, and P3 is applied to host 2, based on their varying local reputation scores at time t1.

Figure 4:
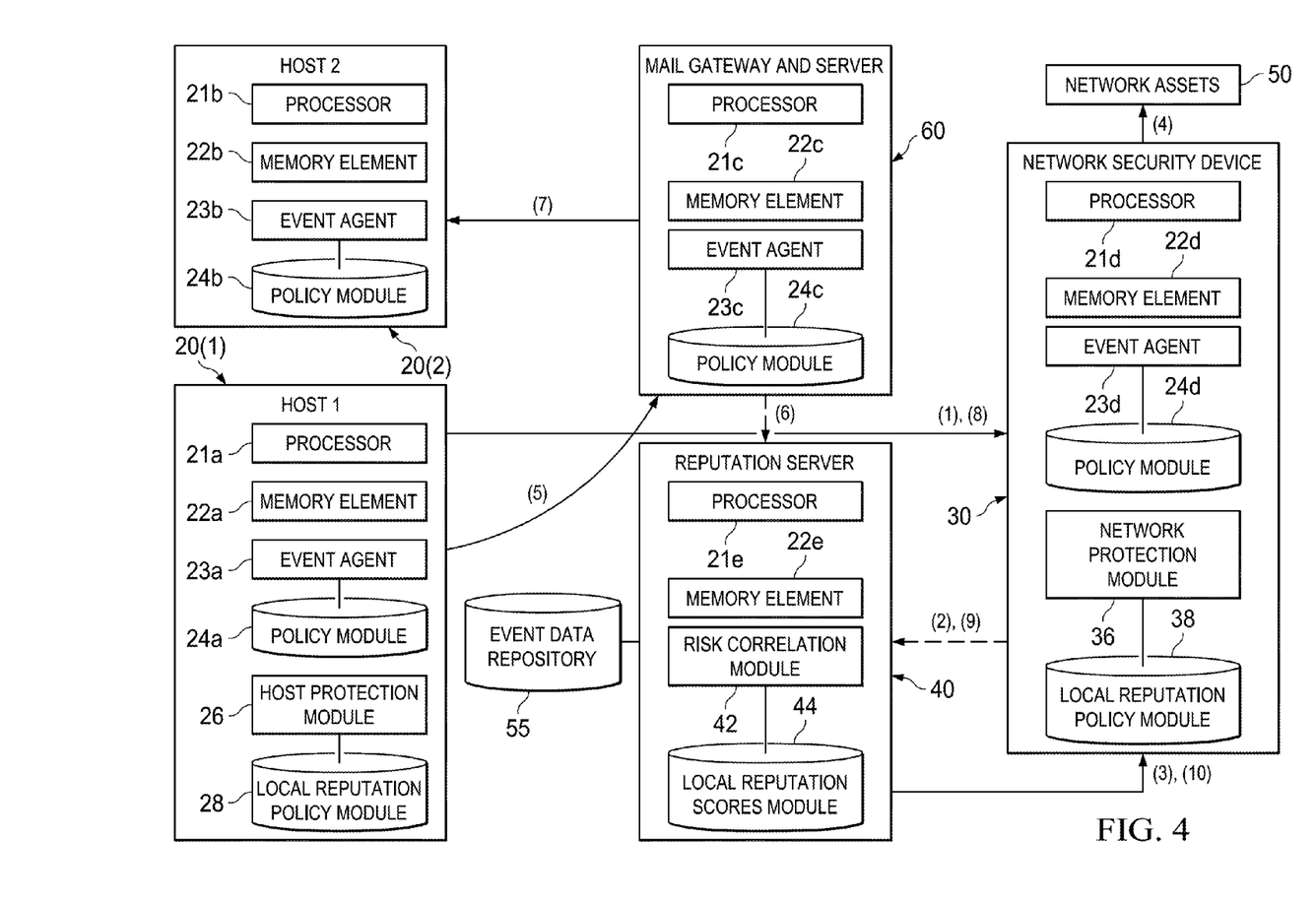
FIG. 4 is a simplified block diagram showing additional details that may be associated with example components of the network environment in accordance with this specification.

Turning to FIG. 4, FIG. 4 is a simplified block diagram illustrating additional details that may be associated with selected components of an embodiment of network environment 10. FIG. 4 also illustrates an example scenario of network communication flows that could occur in private network 14 of network environment 10. FIG. 4 includes hosts 20(1) and 20(2), network security device 30, reputation server 40, network assets 50, event data repository 55, and mail gateway & server 60. Hosts 20(1) and 20(2), mail gateway & server 60, network security device 30, and reputation server 40 each include a respective processor 21a-e and a respective memory element 22a-e, and may additionally include various hardware, firmware, and/or software elements to facilitate the operations described herein.

More particularly, some nodes can be configured as 'event detection nodes' in network environment 10. In one example, host 20(1), host 20(2), mail server & gateway 60, and network security device 30 can each include a respective event agent 23a-d and a respective policy module 24a-d to enable event detection, and event notifications and/or event data logging.

In addition, some nodes in network environment 10 can also (or alternatively) be configured as 'security nodes' such as, for example, host 20(1) and network security device 30. Host 20(1) includes host protection module 26 and local reputation policy module 28 to enable dynamically applying policies to processes on host 20(1) based on local reputation scores of hosts (including host 20(1) itself) and users. Network security device 30 can include a network protection module 36 and a local reputation policy module 38 to enable dynamically applying policies to network communications based on local reputation scores of hosts and users. For ease of illustration, host protection module 26 and local reputation policy module 28 are shown only in host 20(1). Any host in the private network, however, could be configured with these components to inject local reputation scores into policy evaluations (e.g., of network communications and local processes) by the hosts. Similarly, other network elements, such as mail gateway & server 60, could be configured with components similar to components of network security device 30 in order to inject local reputation scores into policy evaluations (e.g., of network communications) by these other network elements.

Reputation server 40 can include a risk correlation module 42 and a local reputation scores module 44 to enable receiving event notifications containing event data, fetching logged event data from event data repository 55, correlating the event data of events occurring in private network 14, and determining and storing local reputation scores of hosts and users associated with the events. Assets 50 represents any network asset of private network 14 (e.g., highest valued assets 50(1), medium valued assets 50(2), lowest valued assets 50(3), remote assets 50(4)). Assets 50 are protected by network security device 30, which could be any network security device protecting the assets of private network 14 (e.g., network security devices 30(1)-(3)).

In the example components shown in FIG. 4, each policy module 24a-d can contain its own policies that are implemented in its corresponding network node of private network 14. Event agents 23a-d can be implemented, along with policy modules 24a-d, in network nodes such as host 20(1), host 20(2), mail gateway & server 60, and network security device 30, respectively. Each event agent 23a-d can be configured to detect events, to identify hosts and users associated with the events, and to generate an event notification containing event data and/or to log event data in event data repository 55. In some implementations, event agents 23a-d may also determine a risk level associated with the detected event, which can be included in the event data.

As used herein, an 'event' refers to behavior or activities associated with a host and possibly a user in a private network and can include network communications (e.g., email, file transfers, accessing network servers, messaging, network connection attempts, etc.) and processes (e.g., setting passwords, transferring information to off-line media such as CD-ROMs or USB sticks, running an application program, system processes, etc.). Furthermore, events can be security related or informational. A security event occurs when risky behavior that is associated with a host and possibly a user is detected by a network node (e.g., an event detection node, which could be the host itself or another node) in a private network, and the risky behavior violates a policy associated with the network node (e.g., emailing confidential information, transferring confidential information to off-line media such as a CD-ROM or USB stick, setting a weak password, executing an unknown application program, etc.). Risky behavior can occur in both network communications and processes on hosts. An informational event occurs when accepted behavior that is associated with a host and possibly a user is detected by network node e.g., an event detection node, which could be the host itself or another node), may be determined not to violate policies of the network node, and is identified for tracking or logging. Accepted behavior can occur in both network communications and processes on hosts. Event data related to security events and informational events may be stored or archived (e.g., in event data repository 55) or sent to a specific location (e.g., event notifications sent to reputation server 40).

Any network node in private network 14 that is monitored for policy violations can be configured as an event detection node to generate event notifications containing event data and/or to log event data. For example, network nodes in a private network that are commonly monitored for policy violations can include hosts (e.g., desktops, laptops, servers, mobile phones, tablets, etc.), appliances, firewalls, routers, gateways, etc., and each of these nodes could be configured with an event agent (e.g., event agents 23*a-d*) to detect events, to identify hosts and users associated with the events, and to send event notifications to reputation server 40 and/or to log event data related to the detected event.

In example embodiments, event agents 23*a-d* can be configured to cooperate with security applications (e.g., antivirus applications) on their corresponding nodes to detect security events. For example, if an antivirus application on host 20(1) detects a policy violation of a process corresponding to a program file (e.g., downloaded from a USB stick), then event agent 23*a* can detect the event from the policy violation, identify a network address of host 20(1), identify a user identifier of a process owner on a host (e.g., a user logged on to host 20(1)), and send an event notification to reputation server 40 and/or log the event data in event data repository 55. In some embodiments, event agent 23*a* may also determine a risk level associated with the particular policy violation (e.g., indicated by policy module 24*a*), and then include the risk level in the event notification or in the logged event data.

Some event detection nodes in private network 14 may store event data related to security and/or informational events in a repository such as event data repository 55. Event data repository 55 can be configured in any memory element suitable for data storage, and is intended to include separate nodes, network-attached storage (NAS), storage area network, file servers, etc. Event data repository 55 is also intended to include memory elements integrated as a local repository of logged event data in an event detection node (e.g., in hosts 20, in mail gateway & server 60, in network security devices 30, etc.). Event detection nodes having a local event data repository may allow remote access to its event data, such as remote access from reputation server 40. Data stored in event data repository 55 could include data related to security events, informational events, or any suitable combination thereof including, for example, identifications of the host and user associated with the particular behavior and an event indicator of the behavior. Thus, some event detection nodes may not transmit event data of security events and/or of informational events in real time, but rather, may store the event data for subsequent access by reputation server 40. In one example implementation, event data for security events is sent to reputation server 40 via event notifications, whereas event data for informational events is stored or logged in event data repository 55, and subsequently fetched by reputation server 40.

Mail gateway & server 60 can facilitate internal and external mail communications of private network 14. In addition, mail gateway & server 60 can be an event detection node, configured with event agent 23*c* to detect events such as email messages, identify hosts and users associated with email traffic, and send event notifications to reputation server 40 and/or store event data in event data repository 55. Mail gateway & server 60 can also be configured to use any suitable protocol such as Simple Mail Transfer Protocol (SMTP).

Reputation server 40 can be configured to receive event notifications from event detection nodes, to fetch security and/or informational event data from event data repositories, or any suitable combination thereof. In some embodiments, reputation server 40 can receive event notifications, in real time, from multiple event detection nodes in private network 14 (e.g., hosts 20, network security device 30, mail gateway & server 60, etc.). The event notifications can include security event data such as host and user identification and an indicator of the behavior that caused the policy violation. Additionally, reputation server 40 can be configured to fetch security and/or informational event data from one or more event data repositories (e.g., event data repository 55), which could be local or remote to an event detection node. Fetching data is intended to include any form of retrieving, receiving, extracting, or otherwise obtaining the data. Reputation server 40 could be scheduled on a regular basis to perform a scan of event data repository 55, to conduct any suitable data mining techniques (e.g., evaluating informational events to determine whether they are relevant to reputation analysis), to crawl event data repository, and to fetch relevant informational and security event data. Furthermore, event data repository 55 could be searched for specific information, and any such information could be fetched by reputation server 40. For example, in some scenarios, if risk correlation module 42 determines a suspicious pattern of events or indications of potentially or definitively risky activities, a search could be performed on event data repository 55 for specific information (e.g., whether a particular user is currently logged on) to substantiate that there is a risk to the network. If a risk is substantiated, then local reputation scores of an associated host and/or user may be adjusted accordingly.

Risk correlation module 42 correlates the risks associated with the detected events to determine a local reputation score for each host and each user associated with the events. Local reputation scores can be stored in local reputation scores module 44. In one embodiment of local reputation scores module 44, local reputation scores of hosts are mapped to respective network addresses (e.g., IP address, MAC address) of the hosts. Similarly, local reputation scores of users can be mapped to respective user identifiers (e.g., username) of the users.

Reputation scores can represent various types of markers, attributes, value ranges, etc. used to provide a ranking or rating mechanism for local reputations of hosts and users in a private network. Furthermore, these scores can include absolute and relative indicators. For example, in one embodiment, a reputation score of a host or user could be a whole number on a defined scale (e.g., 1-10). In another embodiment, a reputation score for a host or user could be a bit map of security events and/or informational events associated with the corresponding host or user. Thus, the possible types of reputation scores that provide the rating or ranking mechanism can be configured with different granularity to convey information about the events or conditions that have affected the reputation of a host or user.

Any type of correlation techniques can be performed to determine a local reputation score. In one embodiment, each host and each user associated with a private network or intranet can begin with a good local reputation score. Each time an event notification is received by reputation server 40, risk correlation module 42 could adjust the local reputation score of the host and the user associated with the event, based on the risk associated with the event. In some embodiments, the risk associated with an event may be quantified (e.g., as a risk level) and included in event data of an event notification sent to reputation server 40 or properly stored in event data repository 55. In other embodiments, the event notification could simply identify the event (e.g., an event indicator) and then reputation server 40 could determine a risk level for the event after receiving the event notification or fetching the event data. Risk levels could correspond to a graduated scale, such that the greater the risk level is for an event, the more the local reputation scores of the host and the user associated with that event are decreased.

In some implementations, event data of certain types of events may be aggregated over time by reputation server 40, or in data event repository 55, such that risk correlation module 42 does not decrease (or increase) a local reputation score based on event data of these types of events until the aggregated number reaches a predetermined threshold (e.g., a threshold number of events in which sensitive data was accessed), or until these types of events are combined with other specified types of events (e.g., events in which sensitive information was accessed combined with events in which the sensitive information was transmitted to others). Importantly, repeated policy violations that do not trigger immediate remedial or preventative action by a security application may nevertheless, eventually cause a local reputation score of a host and/or user associated with such repeated violations to decrease to a predefined threshold. Once the local reputation score has decreased to the predefined threshold, policies may be applied by security nodes (e.g., network security device 30 and host 20(1)) to prevent certain activities by the particular host and/or user in order to proactively protect the network and its hosts.

Mechanisms can be provided to allow an authorized user (e.g., a network administrator) to restore the local reputation score of a user or host to an acceptable level or to gradually increase the local reputation score as certain risky behaviors subside. For example, a local reputation score of a user who had earned a bad local reputation (e.g., repeatedly violating certain low-risk corporate policies) but who had received subsequent training regarding these corporate policies, could be increased to a medium local reputation score until a certain time period passed without additional event data causing the user's local reputation score to further decrease. If a poor local reputation is caused by repeated violations of policy, actions that indicate increased policy compliance may also serve to increase the reputation. In this embodiment, event agents 23*a-d* of event detection nodes may be configured to detect activities (network communications and/or host processes) that comply with certain policies, when the activities are associated with hosts and/or users with poor local reputation scores. Event data for these detected compliance events may include a policy compliance indicator, host identification, and user identification, which can be provided to reputation server 40 and correlated with other event data. The existing poor local reputation scores of the host and/or user can be updated accordingly (e.g., increased if a threshold number of compliance events have been detected).

Network security device 30 can be configured to consume local reputations of hosts and users and to monitor or control network communications based, at least in part, on local reputations. Accordingly, network security device 30 can include any suitable network element such as, for example, a firewall, an intrusion protection system, a gateway, or other node configured with network protection module 36 to actively or passively provide protection to network assets 50 of private network 14. For example, in some embodiments, network security device 30 can passively monitor network communications and provide notification of events, with administrators taking appropriate manual action. Such notifications can be suitably rendered, or sent to a specific location (e.g., reputation server 40, etc.), or simply stored or archived, and/or properly displayed in any appropriate format. In other embodiments in which network security device 30 is configured to actively protect network assets 50, network security device 30 can dynamically apply policies to any network communication it receives based on local reputation scores of a host and/or a user associated with the network communication. Network security device 30 may be in-line with network traffic or intercept or receive copies of network traffic, such as through a mirror port on a switch. In this case, network security device 30 may have no network address (e.g., no IP address and no MAC address) associated with it.

Hosts and users associated with network communications and processes may need to be identified by event detection nodes when detecting events, and by security nodes when consuming local reputations as input to policy evaluations. Identifying hosts and users that are associated with a network communication can be accomplished using various techniques. A host can be associated with a network communication if a network address of the host is the source or destination address of the network communication. Therefore, a host that is associated with a network communication can be identified by a network address, such as an Internet Protocol (IP) address or Media Access Control (MAC) address, which is the source address or the destination address of the network communication.

A user identifier associated with a network communication can be identified by an external out of band mechanism to a directory mechanism such as, for example, Active Directory® directory service owned by Microsoft Corporation, or Remote Authentication Dial In User Service (RADIUS). In another example, a user identifier can be discovered by forcing the user to login to identify his user name, either through a directory mechanism or an internal list of users. In yet another example, a user identifier can be discovered using a host firewall mechanism in which a host agent shares process information (e.g., process owner or user) and host information with a network gateway device, such as a firewall (e.g., network security device 30), by communicating the information using an out of band protocol, or by using a cryptographically secure steganographically hidden in-band protocol in which information is embedded in redundant areas of TCP/IP/ICMP network traffic.

Users may also be determined using other techniques such as discovering a username in a network communication, regardless of encryption. For example, file transfer protocol (FTP), hyper text transfer protocol (HTTP), and instant messaging protocols can have user name and password fields that could be scanned in order to determine the user associated with these network communications. In addition, instant messaging, transport layer security (TLS) and secure socket layer (SSL) protocols can identify users by client certificates. Cryptographic authentication within a current or a prior network communication could also be used to identify users. In other scenarios, users could be forced to logon in order to obtain a user identifier. Once determined, a user to network address association could also be used to identify subsequent communication from the same network address.

Once the network address and the user identifier associated with the network communication have been determined, network protection module 36 can communicate with reputation server 40 to obtain local reputation scores (e.g., from local reputation scores module 44) of the host and the user. Once the local reputation scores are received, network protection module 36 can dynamically select an appropriate policy to apply to the network communication based on the local reputation scores. Different approaches can be implemented by network protection module 36 to dynamically select an appropriate policy based on local reputation scores. In one embodiment, local reputation policy module 38 can provide a mapping of policies to local reputation scores. If both host and user local reputation scores are available for a particular network communication, and the scores are not identical, then in one embodiment, network protection module 36 can be configured to apply the most restrictive policy corresponding to the host and user local reputation scores. In another embodiment, separate policy statements in local reputation policy module 38 could specify user and host reputation scores, applying policy independent of each other. Moreover, local reputation scores could be evaluated with other policy considerations to select an appropriate policy to be applied Network assets 50 shown in FIG. 4 can include any network elements that provide information, resources, or services to users of private network 14, and may have varying degrees of value to the entity associated with the private network. For example, for some entities, assets designated as highest valued assets (e.g., highly sensitive data) could include engineering design servers, source code servers, financial servers, company 'secret sauce' (e.g., trade secret information), and external facing content (i.e., content that represents the entity and that is made available to outsiders of the entity). In additional examples, assets designated as medium valued assets of an entity (e.g., medium sensitivity) could include a corporate phone book, common file servers, and corporate web servers (i.e., servers inside the private network or intranet that users use to share or disseminate information such as corporate announcements, blogs, document repositories, etc.). In yet another example, assets designated as low valued assets could include other assets, not designated as highest valued or medium valued, that provide business continuity even for 'risky' users. Examples of low valued assets could include email servers, a helpdesk, and 'how to' pages.

Like network security devices, hosts 20 can also be configured to consume local reputations of hosts and users, in order to control or passively monitor activities on the host. For example, processes on hosts and network communications sent and received by hosts can each be monitored or controlled based, at least in part, on local reputations of associated hosts and users. Hosts can be configured with host protection module 26 to provide these monitoring and controlling functions. Host protection module 26 can detect an incoming or outgoing network communication and can dynamically apply policies to the network communication based on local reputation scores of the host itself, a destination host of an outgoing network communication, an originating host of an incoming network communication, and/or a user associated with the network communication (e.g., a user sending or receiving the network communication). Host protection module 26 could also monitor or control processes on the host such as file access activities (e.g., a process attempting to access computer source code or company designs), by using local reputation scores of the host and/or a user associated with the process. In another example, host protection module 26 could monitor or control file copying within the host itself or file copying to off-line media (e.g., CD-ROM, USB stick, etc.) if the local reputation score of the host or a user associated with the copying is not sufficient. Other example activities that can be controlled or monitored by hosts, using local reputation scores as input, include requirements for encryption and refusal to display certain files for emails (e.g., files or emails with a 'confidential' message in the header, particular folders selected for display, etc.).

Hosts and users associated with processes on a host may need to be identified to enable the host to consume their local reputations as input to policy evaluations. Processes are associated with hosts on which the processes are running, and each host can be identified by a network address (e.g., IP address or MAC address). A user can also be associated with a process as its process owner or as a user logged onto the host. Hosts and users associated with incoming and outgoing network communications of a host can be identified by the source and destination addresses of the network communication, or any other suitable technique as previously described herein.

An example scenario that could occur in the system is illustrated by flow lines (1) through (10) in FIG. 4. For purposes of illustration, it is assumed that initially, all hosts and users start with good local reputation scores. Flow (1) represents a network communication from a user ('user A'), who is logged on to host 20(1), to access network assets 50. In this example scenario, user A is attempting to access a highest valued asset of the entity, such as a corporate financial server. Network security device 30 is configured to send event notifications to reputation server 40. In this scenario, user A may be authorized to access corporate financial servers, but policy module 24d may include a policy that triggers an event notification each time access is attempted to one of the highest valued assets. Accordingly, event agent 23d may send an event notification, indicated by flow (2), to reputation server 40 identifying user A (e.g., user identifier), host 20(1) (e.g., network address), and the event (e.g., event indicator).

Network security element 30 may also request local reputation scores for user A and host 20(1) from reputation server 40. Reputation server 40 sends local reputation scores to network security device 30, indicated by flow (3). In this first attempt to access the corporate financial server, user A and host 20(1) both have good local reputation scores and thus, network security device 30 allows the network communication to access the corporate financial server, indicated by flow (4).

In this example scenario, after host 20(1) receives information back from the corporate financial server, user A sends the corporate financial information by email to another user ('user B') who is logged on to host 20(2). The email is represented by flow (5) to email gateway & server 60, which has event agent 23c and policy module 24c for detecting emails that violate its policies. If policy module 24c includes an applicable policy violated by the email (e.g., emails cannot contain corporate financial data, emails cannot contain information from highest valued assets, user A cannot email corporate financial data, user A cannot email any sensitive information, emails must be encrypted, etc.), then event agent 23c may determine a source of the email (e.g., network address of host 20(1) and user identifier of user A). Event agent 23c may then send an event notification, indicated by flow (6), to reputation server 40. The event notification can include event data that identifies host 20(1), user A, and the detected event. Alternatively, event agent 23c could store the event data in event data repository 55, which could be configured locally or remotely relative to mail gateway & server 60.

Since the policy violation in this case does not require remedial action (i.e., the email is not blocked), flow (7) from mail gateway & server 60 represents the email being forwarded to user B on host 20(2). If users A and B are collaborating on a project and user A continues this pattern of retrieving information from the corporate financial server and sending the financial information via email to user B, then network security device 30 and mail gateway & server 60 could continue to send event notifications to reputation server 40, identifying user A, host 20(1), and the detected events. In some scenarios, reputation server 40 may also fetch event data of security events and/or informational events from event data repository 55. Risk correlation module 42 may correlate the event data received in the event notifications and fetched from event data repository 55 to determine local reputation scores for host 20(1) and user A.

After a sufficient number of event notifications are received, which indicate that user A is repeatedly violating a data loss policy by accessing confidential information and emailing the information internally, local reputation scores mapped to the network address of host 20(1) and to the user identifier of user A may decrease enough to cause network security device 30 to deny further access to the corporate financial server by user A and/or by host 20(1). Accordingly, if user A sends another network communication to network security device 30, as indicated by flow (8), network security device 30 can send another event notification to reputation server 40, indicated by flow (9), and reputation server 40 can send the decreased local reputation scores of user A and host 20(1) back to network security device 30, as indicated by flow (10). Network protection module 36 may then determine that a policy in local reputation policy module 38 requires blocking network communications associated with a host and/or a user having local reputation scores that meet a certain threshold. Thus, if the local reputation score of host 20(1) and/or if the local reputation score of user A meet the threshold of the policy, then the network communication indicated by flow (8) may be blocked by network security device 30 in this example scenario. The decrease in user A's reputation serves to protect the network, assuming that a user who has acted in a risky manner in one situation may also do so in other ways. For example, if subsequent to this activity, user A makes a mistake and exposes her logon credentials to malicious user C, these credentials will no longer serve to expose corporate financial data.

Figure 5:
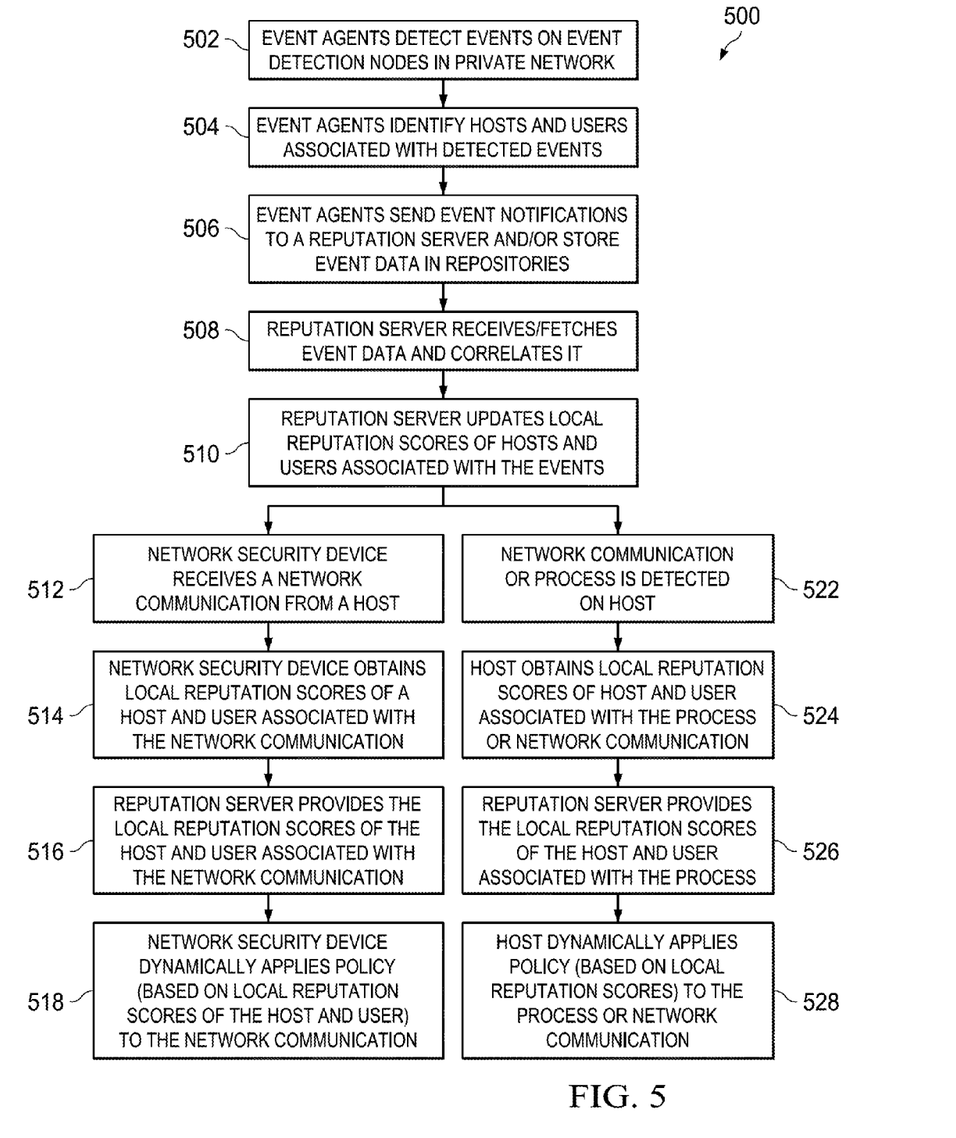
FIG. 5 is a simplified flow chart illustrating example operational steps that may be associated with embodiments of the system in accordance with this specification.

Turning to FIG. 5, FIG. 5 illustrates an overall system flow 500 for determining and using local reputation scores of users and hosts to protect information in a network environment. Flow 500 begins at 502 where event agents in a private network or intranet (e.g., event agents 23*a-d* on host 20(1), host 20(2), mail gateway & server 60, and network security device 30, respectively) detect events on their respective event detection nodes. An event detection node could be a host from which the behavior originates ('originating host'), or a node that receives a network communication from the originating host. Event agents can be configured on numerous network nodes within the private network to detect events, and thereby function as event detection nodes. Furthermore, these event agents (e.g., event agents 23*a-d*) can be operating concurrently as network communications traverse the network, as other risky and acceptable activities occur on originating hosts, and as security applications monitor these network communications and activities.

At 504, event agents can identify hosts and users, by network addresses and user identifiers, respectively, which are associated with the detected events. At 506, event agents that have detected events can send event notifications containing event data to reputation server 40, with each event notification including a host identification (e.g., IP address, MAC address), a user identification (e.g., username), and an event indicator. Alternatively, or additionally, these event agents can store the event data in event data repository 55. The event indicator could simply identify the event in terms of the policy that was violated. In some implementations, the event data could include a quantified risk level assigned to the detected event. For example, a risk level could be mapped to each policy in policy modules (e.g., policy modules 24*a-d*) of the event detection nodes.

At 508, reputation server 40 may receive event notifications from various event detection nodes in the private network and risk correlation module 42 may correlate the event data from the event notifications per user and per host. In addition, reputation server 40 may fetch event data for security and/or informational events that has been logged by event detection nodes, for example, in event data repository 55. This fetched event data may also be included in the correlations. Based on the correlations, at 510 a respective local reputation score can be updated in local reputation scores module 44 for each host and each user identified in the event notifications and/or fetched event data that were correlated.

Local reputation scores can be consumed on network security devices in a private network to control or passively monitor network communications. At 512, network security device 30 may receive a network communication from a host in the private network. After receiving the network communication, network protection module 36 of network security device 30 can identify the host, for example, from an IP address in the network communication indicating the source of the network communication. The identity of a user associated with the network communication may also be identified, for example, using an external out of band mechanism (e.g., Active Directory or Radius), a firewall to force the user to login to identify his username through a directory mechanism or an internal list of users, or a host firewall mechanism, as previously described herein. Once the host and user are identified, network security device 30 can obtain local reputation scores at 514 for the identified host and user. At 516, reputation server 40 provides local reputation scores of the host and user associated with the network communication. At 518, network protection module 36 of network security device 30 can dynamically select and apply policies from local reputation policy module 38 to the network communication, based on the local reputation scores of the host and user. Alternatively, network security device 30 could be passively monitoring the network communications and providing notifications of events, thereby allowing administrators to take appropriate manual action.

Local reputation scores may also be consumed by hosts that can control or monitor incoming and outgoing network communications and host processes, and can also apply other policies local to the host. At 522, host protection module 26 of host 20(1) may detect a process (e.g., data attempting to be written to a USB stick) or an incoming or outgoing network communication. Host protection module 26 can identify host 20(1) as the host associated with a process, using its IP address or MAC address. The identity of a user associated with a process may also be identified, for example, by identifying a process owner of the process, by identifying a user already logged on to host 20(1), or by forcing the user to login to identify his username through a directory mechanism or an internal list of users, as previously described herein. Hosts and users associated with a network communication may be identified as previously described herein. Once the host and user are identified, host 20(1) can obtain local reputation scores at 524 for the identified host and user. At 526, reputation server 40 provides local reputation scores of the host and user associated with the detected process or network communication. At 528, host protection module 36 of network security device 30 can dynamically select and apply policies from local reputation policy module 28 to the process or network communication, based on the local reputation scores of the associated host and user. Alternatively, host 20(1) could be passively monitoring processes and/or network communications and providing notifications of events, thereby allowing administrators to take appropriate manual action.

Figure 6:
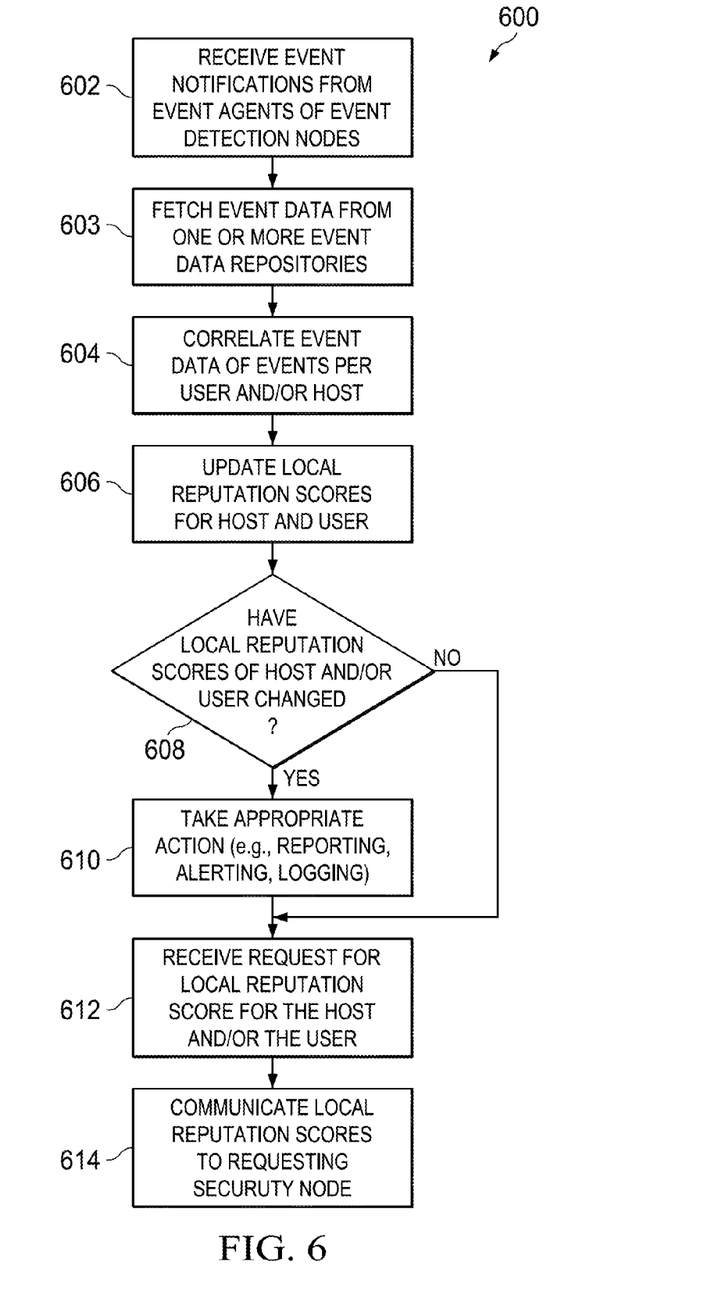
FIG. 6 is a simplified flow chart illustrating additional example operational steps that may be associated with embodiments of the system in accordance with this specification.

Turning to FIG. 6, FIG. 6 illustrates a more detailed flow 600 of operations that may be performed in reputation server 40 of private network 14 for a particular host and user. Flow 600 begins at 602 where reputation server 40 receives event notifications from event agents (e.g., event agents 23a-d) of event detection nodes in private network 14. These event notifications can be received from any number of network nodes configured with a security application including an event agent and a policy module, and can include host identifications, user identifications, and event indicators of the events. At 603, reputation server 40 may fetch event data from one or more event data repositories (e.g., event data repository 55), which can be performed on a regular basis or on demand. Moreover, reputation server 40 can obtain event data for hosts and users by receiving event notifications, by fetching event data, or by any suitable combination thereof. At 604, the event data may be correlated per host and per user. At 606, risk correlation module 42 then updates the local reputation score for the user and the local reputation score for the host.

A determination can be made at 608 as to whether the local reputation score for the host or the user has changed. If at least one of the local reputation scores has changed, then flow can pass to 610 where appropriate action may be taken, for example, logging the change, alerting a network administrator of the change, or reporting the change. Once appropriate action has been taken, or if the local reputation scores for the user and host have not changed, then flow can pass to 612 where reputation server 40 receives a request from a security node (e.g., network security device 30, host 20(1)) for local reputation scores of the host and/or the user. At 614, reputation server 40 can send the appropriate local reputation scores from local reputation scores module 44 to the requesting security node. Thus, the requesting security node can use the scores to dynamically apply policies to a network communication or process, or can passively monitor a network communication or process and send any appropriate alerts.

In example implementations, at least some portions of the activities related to the system for determining and using local reputations of users and hosts to protect information in a network environment outlined herein may be implemented in software in, for example, event agents 23a-d, risk correlation module 42, host protection module 26, and network protection module 36. In some embodiments, this software could be received or downloaded from a web server or provided on computer-readable media in order to provide this system for determining and using local reputations of users and hosts to protect information. In some embodiments, one or more of these features may be implemented in hardware, provided external to these elements, or consolidated in any appropriate manner to achieve the intended functionality.

Furthermore, the embodiments of the system described and shown herein may also include suitable interfaces for receiving, transmitting, and/or otherwise communicating data or information in a network environment such as network environment 10. Additionally, some of the processors and memory elements associated with the various network elements may be removed, or otherwise consolidated such that a single processor and a single memory location are responsible for certain activities. Alternatively, certain processing functions could be separated and separate processors and/or physical machines could implement various functionality. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., memory elements 22a-e) can store data used for the information protection operations described herein. This includes the memory elements being able to store instructions (e.g., software, logic, code, etc.) that are executed to carry out the activities described in this Specification. A processor can execute any type of instructions associated with the data to achieve the operations detailed herein. In one example, one or more processors (e.g., processors 21a-e) could transform an element or an article (e.g., data) from one state or thing to another state or thing. In another example, the functions outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of network environment 10 (e.g., hosts 20, network security devices 30, reputation server 40, assets 50, mail gateway & server 60) may keep information in any suitable type of memory (e.g., random access memory (RAM), read-only memory (ROM), erasable programmable ROM (EPROM), electrically erasable programmable ROM (EEPROM), etc.), software, hardware, or in any other suitable component, device, element, or object where appropriate and based on particular needs. Any of the memory items discussed herein (e.g., memory elements 22a-e, policy modules 24a-d, local reputation policy module 28, local reputation scores module 44, local reputation policy module 38, event data repository 55) should be construed as being encompassed within the broad term 'memory element.' The information being read, used, tracked, sent, transmitted, communicated, stored, updated, or received by network environment 10 could be provided in any database, register, queue, table, cache, control list, or other storage structure, all of which can be referenced at any suitable timeframe. Any such storage options may be included within the broad term 'memory element' as used herein. Similarly, any of the potential processing elements, modules, and machines described in this Specification should be construed as being encompassed within the broad term 'processor.'

Not shown in the FIGURES is additional hardware that may be suitably coupled to processors 21a-e and other components in the form of memory management units (MMU), additional symmetric multiprocessing (SMP) elements, physical memory, peripheral component interconnect (PCI) bus and corresponding bridges, small computer system interface (SCSI)/integrated drive electronics (IDE) elements, etc. The network elements and hosts of FIGS. 1 and 4 (e.g., hosts 20(1)-(n), network security devices 30, reputation server 40, mail gateway & server 60) may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in the network elements and hosts to appropriately manage the operation of the hardware components therein.

Note that with the numerous examples provided herein, interaction may be described in terms of two, three, four, or more network elements and hosts. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements and hosts (e.g., as in FIG. 4). It should be appreciated that the system for determining and using local reputations of users and hosts to protect network information, as shown in the FIGURES, and its teachings are readily scalable and can accommodate a large number of components, as well as more complicated/sophisticated arrangements and configurations. Accordingly, the examples provided should not limit the scope or inhibit the broad teachings of the system as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method comprising:
   correlating, by a reputation server, a first set of event data from a private network, wherein the first set of event data identifies one or more host events associated with a network address of a host in the private network;
   determining a local host reputation score of the host in the private network based on the correlating the first set of event data, wherein the correlating the first set of event data includes determining whether a predetermined threshold number of host events are associated with accessing sensitive data in the private network;
   correlating, by the reputation server, a second set of event data in the private network, wherein the second set of event data identifies one or more user events associated with a user identifier, wherein, for each user event, the user identifier corresponds to a process running on one of a plurality of hosts in the private network, wherein the correlating the second set of event data includes determining whether a predetermined threshold number of user events are associated with accessing sensitive data in the private network;
   determining a local user reputation score of the user identifier based on the correlating the second set of event data; and
   providing the local host reputation score and the local user reputation score to a security node in the private network,
   wherein the security node applies a policy to a network communication associated with the host, the user identifier, and a network asset, wherein the policy is dynamically selected based on the local user reputation score, the local host reputation score, and a sensitivity level of data in the network asset.

2. The method of claim 1, wherein the network address of the host is one of a source address and a destination address of the network communication.

3. The method of claim 1, wherein at least two user events of the second set of event data are associated with different hosts of the plurality of hosts.

4. An apparatus, comprising:
   a memory element configured to store data;
   a processor operable to execute instructions associated with the data; and
   a risk correlation module configured to interface with the memory element and the processor, wherein the apparatus is configured for:
      correlating a first set of event data from a private network, wherein the first set of event data identifies one or more host events associated with a network address of a host in the private network, wherein correlating the first set of event data includes determining whether a predetermined threshold number of host events are associated with accessing sensitive data in the private network;
      determining a local host reputation score of the host in the private network based on the correlating the first set of event data;
      correlating a second set of event data in the private network, wherein the second set of event data identifies one or more user events associated with a user identifier, wherein, for each user event, the user identifier corresponds to a process running on one of a plurality of hosts in the private network, wherein correlating the second set of event data includes determining whether a predetermined threshold number of user events are associated with accessing sensitive data in the private network;
      determining a local user reputation score of the user identifier based on the correlating the second set of event data; and
      providing the local host reputation score and the local user reputation score to a security node in the private network,
   wherein the security node is to apply a policy to a network communication associated with the host, the user identifier, and a network asset, wherein the policy is to be dynamically selected based on the local user reputation score, the local host reputation score, and a sensitivity level of data in the network asset.

5. The apparatus of claim 4, wherein the local host reputation score is mapped to the network address of the host.

6. The apparatus of claim 4, wherein at least two user events of the second set of event data are associated with different hosts of the plurality of hosts.

7. At least one non-transitory computer readable medium having instructions stored therein that, when executed by one or more processors causes the one or more processors to:
correlate a first set of event data from a private network, wherein the first set of event data identifies one or more host events associated with a network address of a host in the private network, wherein correlating the first set of event data includes determining whether a predetermined threshold number of host events are associated with accessing sensitive data in the private network;
determine a local host reputation score of the host in the private network based on the correlating the first set of event data;
correlate a second set of event data in the private network, wherein the second set of event data identifies one or more user events associated with a user identifier, wherein, for each user event, the user identifier corresponds to a process running on one of a plurality of hosts in the private network, wherein correlating the second set of event data includes determining whether a predetermined threshold number of user events are associated with accessing sensitive data in the private network;
determine a local user reputation score of the user identifier based on the correlating the second set of event data; and
provide the local host reputation score and the local user reputation score to a security node in the private network,
wherein the security node is to apply a policy to a network communication associated with the host, the user identifier, and a network asset, wherein the policy is to be dynamically selected based on the local user reputation score, the local host reputation score, and a sensitivity level of data in the network asset.

8. The at least one non-transitory computer readable medium of claim 7, wherein the local host reputation score is mapped to the network address of the host.

9. The at least one non-transitory computer readable medium of claim 8, wherein the first set of event data includes one or more event indicators representing the one or more host events, respectively.

10. The at least one non-transitory computer readable medium of claim 8, wherein the network address of the host is one of a source address and a destination address of the network communication.

11. The at least one non-transitory computer readable medium of claim 7,
wherein the selected policy is a policy based on the local host reputation score when the policy based on the local host reputation score is more restrictive than a different policy based on the local user reputation score.

12. The at least one non-transitory computer readable medium of claim 7, wherein the local user reputation score is mapped to the user identifier of a user.

13. The at least one non-transitory computer readable medium of claim 12, wherein the second set of event data includes one or more event indicators representing the one or more user events, respectively.

14. The at least one non-transitory computer readable medium of claim 7, wherein the private network includes an intranet with one or more remote networks.

15. The at least one non-transitory computer readable medium of claim 7, wherein at least a portion of the first set of event data is selected from one or more event notifications received from at least one event detection node in the private network.

16. The at least one non-transitory computer readable medium of claim 7, wherein at least a portion of the first set of event data and at least a portion of the second set of event data are fetched from an event data repository in the private network, wherein one or more event detection nodes stored the first set of event data and the second set of event data in the event data repository.

17. The at least one non-transitory computer readable medium of claim 7, wherein a process running on the host in the private network initiated the network communication, and wherein a process owner of the process corresponds to the user identifier of the user.

18. The at least one non-transitory computer readable medium of claim 7, wherein at least two user events of the second set of event data are associated with different hosts of the plurality of hosts.

* * * * *